(12) United States Patent
Kishimoto

(10) Patent No.: US 8,088,216 B2
(45) Date of Patent: Jan. 3, 2012

(54) WATER-BORNE COMPLETE INORGANIC ALKALI METAL SILICATE COMPOSITION AND ITS AQUEOUS SOLUTION, AND WATER-BORNE COAT AGENT, ITS AQUEOUS SOLUTION, COMPLETE INORGANIC COLORED COATING MATERIAL AND BINDER FOR HIGH TEMPERATURE AND HEAT RESISTANCE COATING MATERIAL OF THE SAME COMPOSITION, AS WELL AS METHOD OF USING WATER-BORNE COMPLETE INORGANIC ALKALI METAL SILICATE COMPOUND

(75) Inventor: Katsumi Kishimoto, Osaka (JP)

(73) Assignee: Trade Service Corporation, Osaka (JP)

( * ) Notice: Subject to any disclaimer, the term of this patent is extended or adjusted under 35 U.S.C. 154(b) by 658 days.

(21) Appl. No.: 12/141,381

(22) Filed: Jun. 18, 2008

(65) Prior Publication Data

US 2009/0000520 A1 Jan. 1, 2009

(30) Foreign Application Priority Data

Jun. 21, 2007 (JP) ................................ 2007-164287

(51) Int. Cl.
*C04B 28/26* (2006.01)
*C04B 35/66* (2006.01)
*C09D 1/02* (2006.01)
*B28B 7/28* (2006.01)
*B28B 7/34* (2006.01)

(52) U.S. Cl. ........................ 106/629; 106/482; 106/38.3

(58) Field of Classification Search .................. 106/629, 106/482, 38.3
See application file for complete search history.

(56) References Cited

U.S. PATENT DOCUMENTS 3,634,286 A * 1/1972 Yates et al. ........................ 516/77
5,466,280 A * 11/1995 Lee et al. .................... 106/14.12

FOREIGN PATENT DOCUMENTS

| JP | 2756474 B2 | 5/1998 |
| JP | 286565 B2 | 3/1999 |
| JP | 2924902 B2 | 7/1999 |

* cited by examiner

Primary Examiner — Jerry Lorengo
Assistant Examiner — Karam Hijji
(74) Attorney, Agent, or Firm — Edwards Wildman Palmer LLP; James E. Armstrong, IV; Junko Harada

(57) ABSTRACT

The invention provides a water-borne complete inorganic alkali silicate composition capable of solving the problem of gelation occurred in a preservation solution without using anionic organic substances, expanding the range of application dramatically, additionally solving the problem of efflorescence after coating, which is the biggest problem when the molar ratio is low, and furthermore curing at normal temperature without baking, enabling long-lasting effects.

The water-borne complete inorganic alkali silicate composition is comprised of a mixture of an alkali metal silicate including a simple or a mixture of potassium silicate or sodium silicate, a colloidal silica, and a simple or a mixture of a sodium phosphate compound or a potassium phosphate compound.

14 Claims, No Drawings

WATER-BORNE COMPLETE INORGANIC ALKALI METAL SILICATE COMPOSITION AND ITS AQUEOUS SOLUTION, AND WATER-BORNE COAT AGENT, ITS AQUEOUS SOLUTION, COMPLETE INORGANIC COLORED COATING MATERIAL AND BINDER FOR HIGH TEMPERATURE AND HEAT RESISTANCE COATING MATERIAL OF THE SAME COMPOSITION, AS WELL AS METHOD OF USING WATER-BORNE COMPLETE INORGANIC ALKALI METAL SILICATE COMPOUND

CROSS-REFERENCE TO RELATED APPLICATION

The present application claims priority from Japanese Patent Application No. 2007-164287, filed on Jun. 21, 2007, and is hereby incorporated by reference in its entirety herein.

BACKGROUND OF THE INVENTION

1. Field of the Invention

The present invention relates to a water-borne complete inorganic alkali metal silicate composition and its aqueous solution, and a water-borne coat agent, its aqueous solution, a complete inorganic colored coating material and a binder for high temperature and heat resistance coating material of the same composition, as well as the method of using a water-borne complete inorganic alkali metal silicate compound, which are curable at normal temperature and by baking conditions, excellent in antifouling property, scratch resistance, weather resistance and chemical resistance, and capable of forming a clear coating film.

2. Description of the Related Art

Most of what are called as inorganic coating materials were formerly obtained by the Sol-Gel processing, or blending a water-borne mixture of an alkali metal silicate, such as sodium silicate, lithium silicate and potassium silicate, and a colloidal silica or silica powders, with an alkali alkyl siliconate used for the purpose of stabilizing the pot life by restraining gelation during the time course, and preventing cracks resulted from the polymerization contraction occurred during baking. In addition, there are available the aforementioned water-borne mixtures blended with an anionic surfactant or an organic solvent, and also mixed with a fluorinated coating material. However, it is difficult to say that these are genuinely inorganic coating materials since in terms of the hydrophilic property, their water contact angles are greater than 25 degrees due to the contamination of organic materials, resulting in no antifouling property.

Furthermore, concerning conventional organic/inorganic hybrid coating materials or coat agents based on an alkali metal silicate, it is necessary to bake them at 220° C. and higher. Especially in the case of the Sol-Gel processing, it is necessary to heat and bake them at 400° C. and higher in order to remove organic components, thereby causing them to change to yellow and making it impossible to form a clear film.

And also there is a water-borne inorganic coating material composition having a reduced amount of organic contents due to further improvement, which is known by the Japanese Examined Patent Application Publication No. H10-330646 with the title of the invention of "Water-borne inorganic coating material composition and coating film formation method thereof". However, an alkali alkyl siliconate is blended in this coating material composition so that its hydrophilic property decreases, resulting in the lack of antifouling property. Moreover, as carbon in organic substances changes to yellow by heating during clear film formation due to the incorporation of organic substances, the subject coating material is inadequate in the formation of a clear film.

In the case of conventional water-borne inorganic coating materials/coat agents, unless organic substances are blended regardless of their amount, they become unusable in a relatively short period of time (within 3 months) during the retention period after being put on the market because of the silica content gradually turning into gel. Therefore it has been an inevitable way to blend anionic organic substances therein. Moreover, as the baking process is indispensable, they are required to be applied on the surface of objects to be coated and baked within plants before commercialization. As a result, the range of use has been extremely limited since it is not allowed to apply them to existing buildings, fixtures and furniture and the like on sight.

Then a superhydrophilic photocatalyst using titanium oxide capable of drying at normal temperature has been developed, attracting lots of attention at the present. However the aforementioned ambient drying photocatalyst does not have the photocatalytic effect in a place unaffected by ultraviolet rays and also the degrees of adhesion of titanium dioxide as a photocatalyst to a base material is low.

An alkali metal silicate compound has previously faced such problems that when the molar ratio of silica to alkali metal is small, efflorescence occurs, and conversely when the same ratio is increased, the solution during preservation period turns into gel. Therefore such water-borne inorganic coating materials/coat agents using the alkali metal silicate are blended with anionic organic substances without exception so that it is hard to say that they are easy-to-use to users from the viewpoints of the range of use, construction technique, etc.

Accordingly, the present invention has been made in view of the aforementioned circumstances, and it is an object of the present invention to provide a water-borne complete inorganic alkali metal silicate composition capable of solving the problem of gelation occurred in a preservation solution without using anionic organic substances, expanding the range of application dramatically, additionally solving the problem of efflorescence after coating, which is the biggest problem when the molar ratio of silica to alkali metal is low, and furthermore curing at normal temperature without baking, enabling the long-lasting effects.

SUMMARY OF THE INVENTION

In order to achieve the above object, a water-soluble complete inorganic alkali metal silicate composition of the present invention is comprised of a mixture of an alkali metal silicate comprising a simple or a mixture of potassium silicate or sodium silicate, a colloidal silica, and a simple or a mixture of a sodium phosphate compound or a potassium phosphate compound.

The molar ratio of the silica solid content ($SiO_2$) in the aforementioned colloidal silica to the alkali metal solid content in a simple or a mixture of the aforementioned sodium phosphate compound or potassium phosphate compound is preferably within a range of 3.8 to 6.0.

The ratio by weight of the alkali metal solid content in a simple or a mixture of the aforementioned sodium phosphate compound or potassium phosphate compound to soluble potassium silicate is preferably within a range of 0.1 to 5%.

The concentration of the solid content in the water-borne complete inorganic alkali silicate composition mentioned above is preferably within a range of 0.5 to 35%.

As an aqueous solution containing the aforementioned water-borne complete inorganic alkali metal silicate composition, the concentration of the solid content is preferably within a range of 0.1 to 35%.

The present invention provides a complete inorganic colored coating material containing 0.1~35% of the solid content in the water-borne complete inorganic alkali silicate composition which is described in any of paragraphs above, and being added with any or a plurality of a clear coat agent, a binder for photocatalyst or an inorganic pigment.

As a binder thus configured, such a binder for a high temperature and heat resistant coating material is conceivable that the molar ratio and the heavy Baume degree of the silica solid content to the alkali metal solid content in the above mentioned water-borne complete inorganic alkali metal silicate composition is within a range of 2.7 to 4.8 and 16 to 35 respectively.

Also as an invention of method, the present invention provides a method of using a water-borne complete inorganic alkali metal silicate compound, which is characterized in that at the time of using the water-borne complete inorganic alkali metal silicate composition containing a mixture of the alkali metal silicate comprising a simple or a mixture of potassium silicate or sodium silicate, the colloidal silica, and a simple or a mixture of the sodium phosphate compound or the potassium phosphate compound, any or a plurality of zinc oxide, zinc borate or sodium tetraborate is mixed as a fast-acting curative agent.

In addition, the present invention proposes a water-borne coat agent and an aqueous solution thereof, which are primarily comprised of the water-borne complete inorganic alkali metal silicate composition containing a mixture of the alkali metal silicate comprising a simple of a mixture of potassium silicate or sodium silicate, the colloidal silica, and a simple or a mixture of the sodium phosphate compound or the potassium phosphate compound.

Regarding the water-borne complete inorganic alkali metal silicate composition in accordance with the present invention, the present invention provides the water-borne complete inorganic alkali silicate composition which is capable of solving the problem of gelation occurred in a preservation solution without using anionic organic substances, expanding the range of application dramatically, additionally solves the problem of efflorescence after coating, which is the biggest problem when the molar ratio is low, and furthermore curable at normal temperature without baking, enabling long-lasting effects.

DETAILED DESCRIPTION OF THE PREFERRED EMBODIMENTS

In what follows, embodiments of the present invention will be described in order to provide sufficient understanding. In addition, the following embodiments are mere examples for realizing the present invention, and any description in the embodiment of the present invention should not be construed to define or limit the technical scope of the present invention.

The present invention primarily is intended to provide a water-borne complete inorganic alkali metal silicate composition containing a mixture of an alkali metal silicate comprising a simple or a mixture of potassium silicate or sodium silicate, a colloidal silica, and a simple or a mixture of a sodium phosphate compound or a potassium phosphate compound.

In general, it's common knowledge that in an alkali metal silicate, the higher the molar ratio is, the stronger three-dimensional netted structure of binding after baking is obtained, contributing to increased water resistance and hardness. The present inventor invented a method of using the alkali metal silicate under conditions that its molar ratio was low but high enough to have it to meet the intended use and anionic organic substances were not used.

Furthermore, although as the alkali metal silicate, sodium silicate, potassium silicate and lithium silicate are well known, the present inventor invented that a very high degrees of transparency is obtainable by the water-borne complete inorganic alkali metal silicate composition containing a mixture of the alkali metal silicate comprising a simple or a mixture of potassium silicate or sodium silicate, the colloidal silica, and a simple or a mixture of the sodium phosphate compound or the potassium phosphate compound. When preparing the colloidal silica blended with primarily potassium silicate and a certain amount of sodium silicate, for example, it was found that a solution with a very high degree of transparency was obtained and the solubility of silica in the alkali metal silicate was good. Furthermore, blending of a moderate amount of a simple or a mixture of the sodium phosphate compound or the potassium phosphate compound in the solution found that the solution was very effective in preventing the phenomena of blistering or cracks caused by the quick-drying property the solution has when been applied at normal temperature or the quick cold curing at the time of baking.

Especially by applying the aforementioned composition which was prepared by blending a mixture of mainly potassium silicate and a certain amount of sodium silicate as mentioned above with the colloidal silica, or the same composition blended with a moderate amount of a simple or a mixture of the sodium phosphate compound or the potassium phosphate compound (hereinafter referred to as the composition of embodiment) on the surface of inorganic base material in the form of super-thin film, sufficient effects were obtained on the provision of hydrophilic property and prevention of contamination without any change in the feeling of inorganic base material.

The inventor of the present invention focused on the water-absorbing property and extremely high water solubility that the sodium phosphate compound or the potassium phosphate compound has as described above.

As the methods of forming the aforementioned thin film, there are various methods available including spray coating, coating with a cloth, coating by coater and spin coating. Usually when an alkali metal silicate compound is coated in the same manner as mentioned above, the surface of film contacting the atmosphere first starts drying, causing difficulty in drying of the moisture inside the film. For example, in the case of a metal-base material, such as stainless steel, for example, when it is heated at the time of baking, the temperature of the base material increases faster than that of the film itself due to thermal conduction to the base material which has a higher thermal conductivity. Then it causes such phenomena to occur that the moisture inside the film boils, ruptures the surface of film and escapes as vapor, resulting in the generation of pin holes and the whitening of the surface of film. In addition, even in the case of ambient drying, it takes a long time for the moisture inside to evaporate, during which the alkali content reacts with the moisture in the air, contributing to the phenomenon known as efflorescence.

However, when a moderate amount of a simple of either the sodium phosphate compound or the potassium phosphate, or a mixture of them, is added to the alkali metal silicate compound, it is dispersed in the alkali metal silicate compound to form a matrix. As a result, the moisture retained inside the film is well absorbed by the matrix and the moisture exceeding the absorption capacity of the matrix is discharged to the film surface for evaporation so that the moisture inside film is easily removed so as to accelerate drying of the film.

The volume control of the water retained in a simple of either the sodium phosphate compound or the potassium phosphate, or a mixture of them is determined by the additive amount of solid content in a simple of either the sodium phosphate compound or the potassium phosphate, or a mixture of them. The aforementioned additive amount of solid content is adjusted to fall in within a range of 0.1 to 5 w % of the total solid content. If the additive amount is too small, the effect disappears. While, if it is 5 w % and more, the pH balance is disrupted to initiate a reaction, contributing to the occurrence of phenomenon of gelation.

Meanwhile, what is here referred to as the molar ratio means the ratio of the total molar amount of the alkali metal content [potassium in the form of potassium oxide ($K_2O$)+ sodium in the form of sodium superoxide ($NaO_2$) in the present invention] to that of the silica content ($SiO_2$) contained in the water-borne complete inorganic alkali metal silicate composition, which is 1:3.8. More specifically, the molar ratio of the silica solid content ($SiO_2$) in the aforementioned colloidal silica to the alkali metal solid content in a simple of either the sodium phosphate compound or the potassium phosphate compound, or a mixture of them, as mentioned above, is preferably within a range of 3.8 to 6.0.

It was found by experiment that the drying time differs depending on the concentration of solid content in the aforementioned composition of embodiment, which could be within a range of 0.5 to 35%. When used at normal temperature, it is more effective for drying that the concentration of solid content is within a range of 0.5 to 20%. In addition, when the aforementioned composition of embodiment is used after it is mixed and agitated with a mixture or a simple substance of zinc oxide, zinc borate or sodium tetraborate, all of which are fast-acting curative agents, with the weight ratio of 0.2 to 5% to the total solid content in the aforementioned composition of embodiment before application, it enables the composition of embodiment to dry for about 30 minutes at the maximum even if the concentration of the solid content therein is within a range of 10 to 35%.

From the viewpoints of the temperature and the time required for baking, the aforementioned composition of embodiment has the following properties. The amount of water content retained therein is already extremely small at the stage of cold curing due to the water-removability effect of a simple of either the sodium phosphate compound or the potassium phosphate compound, or a mixture of them, so that such problems do not occur as blistering due to the boiling of water content inside the film or cracks even if it is directly heated at high temperature. In addition, when the alkali metal silicate compound is baked at the temperature of 200° C. for 20 minutes which is the minimum heating condition so as to form a strong siloxane bond, it is possible to directly heat and bake it at high temperature without preliminary drying at low temperature, bringing about positive economic effects.

Moreover, the film achieves pencil hardness (based on JISG3318) of 6 H at maximum under the condition of ambient drying, and 9 H and more if it is baked. Furthermore, if the film thickness was within 2 μm, even when it was baked, it was found that no peel-off and cracks occurred in 90 degrees bending processing and laser cutting processing.

Especially, the concentration of the solid content in the composition of embodiment to be baked may be within a range of 0.5 to 35 w %. In order to obtain a clear thin film finish, it is appropriate to have the concentration of solid content of 0.5 to 20 w %, and more preferable to have that of 3 to 15 w %. When it is used as a binder to produce inorganic coating materials blended with pigment, it is preferable to use it with the concentration of solid content being 25 to 35 w %. The following coating methods can be arbitrarily selected: recoating several times of the composition of embodiment with the reduced concentration of solid content (0.5 to 10 w %) by means of a spray gun which enables fine atomization, decreasing the number of painting by increasing the solid content (10 to 20 w %) in order to increase working efficiency, and the like. In addition the composition of embodiment can be easily applied with a cloth in which it is impregnated so that it is characterized in that it can be used for repair and application to existing buildings, fixture and furniture, etc. at ambient drying conditions.

And also, if the composition of embodiment, having the solid content of 0.1 to 35%, is further added with any or a plurality of a clear coat agent, a binder for photocatalyst or an inorganic pigment, it enables the prevention of efflorescence and the increase of superhydrophilic property to further high level, the remarkable decrease in the amount of precipitation of alkali generated following prolonged use, which is characteristic of alkali metal silicate, and another duration of effectiveness.

It has become usable for such objects as existing tiles, kitchen sinks, walls of house, bare concrete walls, large-size stainless steel tanks, etc., which cannot be heated and cured, and to which it previously couldn't been used. It also has enabled the prevention of a bad odor of residual blood of fishes by applying it to the surface of interior walls of insulated truck and simply washing the inside the truck. Additionally it has widely become usable for exterior walls of stainless steel rail vehicles, and interiors and exteriors of buildings made of metals including stainless steel, aluminum and titanium.

EXAMPLE

Although the alkali metal silicate includes sodium silicate, potassium silicate and lithium silicate, in the present invention, potassium silicate was used as an alkali metal silicate base.

As potassium silicate, potassium silicate A, potassium silicate B, potassium silicate C, potassium silicate 2K, and potassium silicate 1K are well known. The molar ratio of potassium silicate 1K is low, such as 1.8~2.2, causing difficulty in working due to larger quantity of colloidal silica to be mixed. In the case of potassium silicate 2K, it has the high molar ratio of 3.4~3.7 but low heavy Baume degree (specific gravity) so that it is not suitable for producing high concentration solution. Therefore potassium silicate A, B and C are suitable as the alkali silicate base. Potassium silicate A and C, in particular, are the most effective on workability in dissolving the colloidal silica.

For adjusting the molar ratio of silica content in siloxan bond film formation, the colloidal silica with the concentration of solid content of 20% or 40% is common, and both can be used. There are several manufacturers of colloidal silica (such as ADEKA Corp. and Nissan Chemical Industries, Ltd.), but regardless of manufacturer, any colloidal silica may be used. The colloidal silica with the solid content of 40% and 20%, both may be applied, and that with other concentration of solid content may be used.

The present invention uses a simple or a mixture of the sodium phosphate compound or the potassium phosphate compound to prevent cracks which are likely to occur when a siloxane bond is formed and polymerization contraction is brought about. By taking advantage of the high water-absorbing property and extremely high water-solubility thereof, in particular, it enables the moisture inside the film to be absorbed to evaporate to the atmosphere, contributing to the provision of quick drying property.

As a sodium phosphate compound, sodium dihydrogen phosphate crystal ($NaH_2PO_4.2H_2O$) including sodium dihydrogen phosphate anhydrous ($NaH_2PO_4$), disodium hydrogen phosphate crystal ($Na_2HPO_4.12H_2O$), trisodium phosphate anhydrous ($Na_3PO_4$), trisodium phosphate crystal ($Na_3PO_4.12H_2O$), tetrasodium pyrophosphate anhydrous ($Na_4P_2O_7$, tetrasodium pyrophosphate crystal ($Na_4P_2O_7.10H_2O$), sodium dihydrogen pyrophosphate ($Na_2H_2P_2O_7$), sodium tripolyphosphate ($Na_5P_3O_{10}$), sodium tetrapolyphosphate ($Na_6P_4O_{13}$), sodium hexametaphosphate (($NaPO_3)n$), sodium acid metaphosphate ($[Na_xH_y(PO_3)_{x+y}]n$), whether a mixture or simple, can be used. As an added substance to alkali metal silicate, however, sodium dihydrogen phosphate is preferable because of its high water-solubility and mild acidity. A potassium phosphate compound may also be usable.

The application to exterior surfaces of objects outside, such as a bare concrete, is susceptible to weather or climate changes. Therefore it is necessary for the film to dry as quickly as possible, and not to be affected by efflorescence due to the absorption of the moisture in the atmosphere, adhesion of dust, and rainfall. The use of a compound or a simple substance of zinc oxide, zinc borate or sodium tetraborate in combination is effective for further increasing the curing speed.

Sodium silicate is added to potassium silicate to accelerate the solubility of the colloidal silica. Any kind of sodium silicate may be used. Generally, however, sodium silicate No. 1 or sodium silicate Special No. 1, which has the high concentration of solid content, is preferable for convenience of production since a small amount of addition is sufficient.

Example 1

(Manufacturing method of an aqueous solution of waterborne complete inorganic alkali silicate composition) Table 1 shows the compositions of materials for both ambient drying and thermal curing types.

TABLE 1

Compositions of materials for both ambient drying and thermal curing types

| Name of material | Molar ratio: 4.3 | Molar ratio: 5.0 | Molar ratio: 5.4 | Molar ratio: 6.0 |
|---|---|---|---|---|
| C potassium silicate | 200 g | 200 g | 200 g | 200 g |
| Colloidal silica 20% | 163 g | 183 g | 223 g | 281 g |
| Sodium silicate No. 1 | 14 g | 14 g | 14 g | 14 g |
| Aqueous solution of sodium dihydrogen phosphate | 8 g | 8 g | 8 g | 8 g |
| Dilution water | 249 g | 249 g | 249 g | 249 g |

Here, the molar ratio means that of silica solid content to alkali metal solid content.

100 g of powder reagent of sodium dihydrogen phosphate was dissolved into 200 g of water with heat.

The stock solution No. 1 with the concentration of solid content of 20% was prepared based on the aforementioned aqueous solution. The transparency and pot life of the stock solution 1 is as shown in Table 2.

TABLE 2

Stock solution No. 1

| | Concentration of solid content | | | |
|---|---|---|---|---|
| | 20% | 20% | 20% | 20% |
| Transparency of solution | Good | Good | Good | Slightly milky white |
| Pot life | Good for 6 months | Good for 6 months | Good for 6 months | Good for 6 months |

Subsequently, a solution with the concentration of solid content of 13.33% was prepared by diluting the above stock solution with water at the ratio of 1 to 0.5 by weight, and then the tests listed in Table 3 were conducted.

TABLE 3

Application tests of ambient drying type with the concentration of solid content of 13.3% (with a cloth on SUS-304), recoating three times

| | Coating film thickness | | | |
|---|---|---|---|---|
| | 1.5~3 μm | 1.5~3 μm | 1.5~3 μm | 1.5~3 μm |
| Pencil hardness | <6H | <6H | <6H | <6H |
| Eraser test of magic marker | Good | Good | Good | Good |
| Weather resistance | Good after exposure for 6 months | Good after exposure for 6 months | Good after exposure for 6 months | Good after exposure for 6 months |
| Transparency of coating film | Good | Good | Good | Good |
| Drying speed | 2~3 min after application | 2~3 min after application | 2~3 min after application | 2~3 min after application |

At the low molar ratio of 3.8, a transparent and colorless solution was obtained. As the molar ratio was increased, the solution became slightly milky white. It was found that the higher the molar ratio was, the higher the concentration of milky white color increased, and at the maximum molar ratio of 6 and higher, gelation occurred in the solution during the retention period after preparation without the addition of alkali alkyl siliconate or anionic surfactant. This is because the disruption of a balance of alkali metal content versus silica content charged with a minus ion in the solution leads to the agglomeration of silica content. Then various experiments found that the molar ratio of 3.8 was the lowest level so as to prevent the occurrence of efflorescence, which is a specific property of alkali metal silicate, and the gelation of the solution during the retention period after preparation, and to achieve the stability of the solution, serving the purpose of use.

It was also found that at the molar ratio of 3.8 and lower, the coating film formed was likely to absorb much moisture from the air, resulting in the remarkable precipitation of alkali content and increasing the occurrence of efflorescence problem and slimy sense of touch, which is specific to alkali. Therefore the following was found: The solution with the molar ratio of 3.8 and less was inadequate for ambient drying. At the molar ratio of 6.0, the solution showed a slightly milky white, and at the molar ratio of 6.0 and more, it turned into gel for 1 to 10 weeks during the retention period. And the higher the molar ratio was, the shorter time it took to turn into gel.

It can be visually confirmed that the higher the molar ratio is, the deeper the color of milky white becomes, showing a lot of colloidal silica undissolved. For the test purpose, 5 to 7% of alkali alkyl siliconate containing organic components was added, which proved that gelation could be prevented, but the hydrophilic property was significantly decreased. Taking these results and the recycling efficiency of coated members in the future into consideration, however, a complete waterborne inorganic coating material without containing any organic substances is promising, and an alkali metal silicate compound is preferable, which hasn't been developed yet but is complete water-born inorganic, having high versatility as both ambient curing and thermosetting types and the molar ratio being 3.8 to 6.0.

(Evaluation Test by Molar Ratio by Means of Thermosetting)

The evaluation test by molar ratio by means of thermosetting was conducted in accordance with the conditions below. The results are shown in Table 4.

| | |
|---|---|
| Base material; | SUS-304 1.2 mm with hairline finish |
| Baking; | 250° C. × 30 min |
| Concentration of solid content; | 13.3% in solution |
| Method of coating; | Wipe and smear with a cloth, 3 times |
| Coating film thickness; | About 1~2 μm |

TABLE 4

Evaluation test by molar ratio by means of thermosetting

| Contents of test | Molar ratio: 4.3 | Molar ratio: 5.0 | Molar ratio: 5.4 | Molar ratio: 6.0 |
|---|---|---|---|---|
| Pencil hardness | <9H | <9H | <9H | <9H |
| Immersion in the hot water at 90° C. for 200 Hr | Not particular (pealing & color) | Not particular (pealing & color) | Not particular (pealing & color) | Not particular (pealing & color) |
| Acid resistance Immersion in hydrochloric acid (1 Kmol/m3) for 24 Hr | Not particular | Not particular | Not particular | Not particular |
| Alkali resistance Immersion in sodium hydrate (1 Kmol/m3) for 24 Hr | Not particular | Not particular | Not particular | Not particular |
| Removal of magic marker after immersion in the hot water at 98° C. for 40 Hr | Removed | Removed | Removed | Removed |
| Thermal shock Repetition of heating at 250° C. for 30 min and cooling with water, 35 times | No cracks | No cracks | No cracks | No cracks |
| 2 mm grid cutting | Not particular | Not particular | Not particular | Not particular |

(Manufacturing Method of Water-borne Inorganic Chemical Film; the Molar Ratio of 4.3 and Concentration of Solid Content of 20%)

Each of the following substances is measured to prepare for manufacturing the above film: 200 g of potassium silicate C (by Nippon Chemical Industrial Co., Ltd), 163 g of colloidal silica with the solid content of 20% (by ADEKA Corp.), 14 g of sodium silicate Special No. 1 (by Osaka-Keiso K.K.), 8 g of aqueous solution of sodium dihydrogen phosphate obtained by dissolving with heat the powder of sodium dihydrogen phosphate (Taihei Chemical Industrial Co., Ltd.) in water with the ratio of the powder to water being 1 to 2 w %, and 249 g of dilution water (tap water) so as to adjust the solid contents to 20% . . .

1) First of all, 200 g of potassium silicate C is put in a stainless steel heating and agitating container, and heated. At the same time, keeping the level of transparency of the potassium silicate C solution, the colloidal silica is put little by little into the solution with agitation.
2) Then, about 50 g of dilution water is put into a container with 14 g of sodium silicate Special No. 1 and well agitated, and 100 g of dilution water is put into another container with 8 g of sodium dihydrogen phosphate and well agitated.
3) After the inputting of all colloidal silica is completed, the diluted sodium silicate Special No. 1 is added with agitation, and further heated and agitated. When the degree of solution viscosity is increased by heating, the rest of dilution water is put to suppress the degree of solution viscosity.
4) Then, the diluted solution of sodium dihydrogen phosphate is put little by little and well agitated. When the solution becomes transparent, heating is discontinued. Then the rest of dilution water is put and agitated continuously, and cooled with agitation not to form a film on the surface of the solution.
5) Finally, heated and evaporated water is added so as to achieve the prescribed total weight for manufacturing the water-borne inorganic chemical film with the reference concentration (20%).
6) Especially the sodium dihydrogen phosphate solution is acidic so that it should be put little by little with heating after being diluted.
7) In order to enable easy coating and drying as an ambient drying type, the solution with the molar ratio of 4.3 and the concentration of solid content of 13.3% is prepared by diluting 100 g of solution with the solid content of 20% with 50 g of water for the adjustment of the concentration of solid content. (Experience shows that the solution with the concentration of solid content of 10 to 15% enables the easiest coating, showing the high drying property and stability during baking.)

The solution with the molar ratio of 4.3 to 6.0 is also manufactured in the same manner based on the prescription of materials. It may be manufactured by blending at normal temperature without dissolution with heat, but the method of manufacturing by heating is preferable in the case of the concentration of solid content of 20% and more. When the solution with the low concentration of solid content such as 20% and less is directly manufactured, it may be achieved by adjusting the amount of dilution water to be put to have the solid content intended.

(Coating Method by Applying an Ambient Drying Type)

Generally, the ambient drying type can be applied to objects to be coated which have been treated with alkali degreasing or completely degreased. A water-borne inorganic coat agent, which our company invented, may be applied with a cloth on the surface of objects to be coated at normal temperature as a primer for the present invention.

Coating methods include 1) a coating by a spray gun, 2) a coating with an ultrasonic gun, 3) an immersion coating, 4) a spin coating, 5) a roller coating, 6) a coating with a cloth or brush, 7) a coating by coater, and 8) a flow coating. The most appropriate coating method may be selected depending on the shape of object to be coated, the degrees of finish of the surface, etc.

However, even if an object to be coated is completely degreased and dried, the water-repellent phenomenon can often be observed on the surface of the object. In this case, organic coating materials can be applied without problems, but water-borne inorganic coating materials (coat agents) cannot be applied well due to the occurrence of flipping phenomenon thereof.

If so, it is intended to increase the amount of coating material (coat agent) to be applied and apply more, but it results in the occurrence of sagging defects, which is one of the biggest problems for water-borne inorganic coating materials (coat agents).

The biggest contributors to such problems include: 1) Degreasing is incomplete, 2) Degreasing fluid and other contaminants remain, and 3) Objects to be coated, such as ceramics and vitreous enamel products which are produced by firing with glaze, may have such a property as to cause the flipping phenomenon. It is very difficult to visually judge whether the flipping phenomenon will occur or not on the surface of coating object already degreased, cleaned and dried, constituting a big factor of occurrence of failure conditions.

In the case of the present invention, however, a super-thin film can be formed in the following manner: Taking advantage of such characteristics as easy application with a cloth and quick-drying property, the present invention is diluted with water to have the solid content of 1 to 15%, and applied as a primer coating to a base material to be coated with a sponge, a cloth, a brush, etc. At this time, if the flipping phenomenon is partly observed, the subject site is rubbed with the agent of the present invention so that dirt is removed and a film is formed. At the same time, a very thin film with interference fringes is formed on the base material to be coated. When the agent of the present invention with the solid content of 3 to 15% is applied by a spray gun on the coating surface after the surface treatment as mentioned above, the interference fringes disappear and a super-thin film is formed without pinholes.

This can be achieved because of the ambient and quick drying property, and it is the best way to substantially reduce product failure during the working process of water-born inorganic coating material (coat agent) preliminary. It enables the reduction of manufacturing cost of water-born inorganic coating material (coat agent) which has been identified as a difficult problem, resulting in the expansion of application.

It also enables the water-borne inorganic coat agent that our company developed to be used as a primer coat agent as mentioned above, and provides options to use separately depending on construction site, conditions, etc.

Example 1 of Experiment

Tests of antifouling property, fingerprint resistance and impact resistance of stainless steel by coating film thickness Tests of fingerprint resistance, antifouling property and impact resistance were conducted on each specimen that had been applied with surface treatment based on the following conditions. The results are shown in Table 5.

Solid content;      5%
Coating method;     Air-spray gun
Curing method;      200° C. × 20 min
Base material;      Stainless steel SUS-304, 1.2 mm, Vibration finish

TABLE 5

| Specimen | Film thickness | Hardness | Fingerprint resistance | Antifouling property | Impact resistance |
|---|---|---|---|---|---|
| 1 | 1 μm | 9H and more | ○ | ○ | ○ |
| 2 | 1 μm | 9H and more | ○ | ○ | ○ |
| 3 | 0.2 μm | 9H and more | ○ | ○ | ○ |
| 4 | 2 μm | 9H and more | ○ | ○ | ○ |
| 5 | 3 μm | 9H and more | ○ | ○ | X |
| 6 | 0.1 μm | 9H and more | Δ | Δ | ○ |
| 7 | 3 μm | 9H and more | ○ | ○ | Δ |

The evaluation method is as follows:

Hardness;
  Pencil hardness (based on JISG3318),
Fingerprint Resistance;
  A fingerprint was left and it was judged visibly whether the fingerprint was traceable or not (○; Barely visible, Δ; Faintly visible, X; Clearly visible)
Antifouling Property;
  A magic marker was used to draw a line. 24 hours later, the line was wiped with a cloth immersed in water and the condition of its trace was evaluated (○; Completely removed, Δ; Partially remains, X; Never comes off).
Impact Resistance;
  The evaluation was made in accordance with an impact resistance test/DuPont Method (by dropping a sphere punch of ½ inch in diameter having a load of 1 kg from a height of 500 mm to provide an impact) (○; No peel-off, Δ; Partially peel-off)

These experiments showed that the film with a thickness of 0.2 to 2 μm was preferable for baking finish to stainless steel. However, depending on use conditions, coating films with various thicknesses can be used.

Example 2 of Experiment

By using the aforementioned composition of embodiment in accordance with the conditions below on stainless steel in combination, the tests of contaminant removability, hydrophilic property and change of color of coating film with time were conducted. The results are shown in Table 6.

Solid content; 13%
Degreasing Method;
    A protection film attached to SUS was removed, and without getting along normal cleaning and degreasing, the water-borne inorganic coat agent multi-type, which is the aforementioned composition of embodiment, was applied with a cloth for use as a primer.
Coating Method; Coating with a Cloth
Overcoat;
    The water-borne inorganic coat agent multi-type, which was the same as the primer coat agent, was applied over the primer with a cloth.
Curing method; At normal temperature
Base material; Stainless steel SUS-304, 1.2 mm, hairline finish

TABLE 6

Example of experiment 2

| Specimen | Period of observation | Hydrophilic property | Contamination removability | Deterioration of coating film |
|---|---|---|---|---|
| 1 | 6 months | ○ | ○ | ○ |
| 2 | 8 months | ○ | ○ | ○ |
| 3 | 1 year | ○ | ○ | ○ |

Evaluation Method;
    The specimens prepared in accordance with the above conditions were set at an inclination angle of 35 degrees, facing south, and were subjected to outdoor exposure conditions for a prescribed period of time. And the results were observed.
Hydrophilic Property;
    Contaminated objects piled on the top of film were removed by washing with water. The surface of film after cleaning was dried naturally for 24 hours, and the contact angle with water was measured (○; Contact angle is 10 degrees and less, Δ; Contact angle is 20 degrees and less, X; Contact angle is 20 degrees and more).
Contaminant Removability;
    Dirt piled on the top of film was lightly wiped off with a wet cloth and the removability was observed (○; Removed by lightly wiping off two times, Δ; Removed by lightly wiping off four times, X; A slight trace of contaminants remained after lightly wiping off four times).
Deterioration of Coating Film;
    Visual observation was carried out whether there had been any development of phenomenon, such as efflorescence (○; No development, Δ; Slight development observed, but washable with water, X; Observed visually and not removable by washing with water).

Example 3 of Experiment

At a brewery, a stainless steel storage tank was applied with the composition of embodiment by spray and left standing. It is common that fermenters being dispersed into the air attach to the tank surface in two weeks and the surface gets black due to the contamination with mold. The effect of preventing this phenomenon was confirmed.
Object; 2 m in diameter×3 m in height (SUS-304)
Solid content; 10%
Degreasing Method;
    An acidic gel coat agent was applied on the SUS surface, and left standing for 2 hours. The present invention was diluted with water to have a solution of 5%. After washing the surface to clean with water, the solution was applied to the surface evenly with a cloth as a primer to provide the hydrophilic property.
Coating method; Recoating by a spray gun, 4 times
Curing method; At normal temperature
Period of observation; 13 months
Result;
    Generally, fermenters dispersed into the air attach to the surface much enough to cause the surface to look black as tar in about 2 weeks or much earlier during the summer months when the temperature is high. However, no mold was observed on the surface even after a lapse of 13 months. Furthermore no development of phenomenon, such as efflorescence, was confirmed.

Example 4 of Experiment

When the ice containing blood thaws and attaches to interior walls inside an insulated truck for transporting fish and seafood products, it causes a strong bad odor to be released. The residual blood and the source of odor cannot be removed by normal cleaning, causing a big problem. In order to solve this problem, an experiment was carried out to confirm whether they could easily be removed only hydraulically if the present invention was simply applied to interior wall surfaces.
    The water-borne inorganic coat agent of the aforementioned composition of embodiment was used as a primer and a top coat agent, and the same composition was applied as an intermediate coating for recoating two times to the whole interior walls of stainless steel refrigerator or cold box mounted on a new 4-ton vehicle.
    It is common that even a new car starts having a bad odor in two or three days and much earlier in summer in particular. It is also common that it's very difficult to clean dirt piled therein completely. As a result of applying the aforementioned composition of embodiment to the interior surface of the vehicle for use in routine work, however, there was no odor at all even after the lapse of 4 months. The cleaning of the refrigerator was conducted in the same way as usual. More specifically, the tap water was poured by hose into the inside of refrigerator mounted in the vehicle after it got off work such as the transportation of goods, and dirt was cleaned hydraulically and discharged with water. It was found that substances contained in blood, such as the oil and protein contents, fell away very easily and the composition of embodiment was very effective in removing contaminants, the source of bad odor.

Example 5 of Experiment

For the purpose of removing a bad odor within a bathroom of some convenience store, the experiment to restrain odor generation was carried out by applying the composition of embodiment to the interior surface of sanitaryware products. This experiment was conducted at 12 different stores.
    First of all, after removing the water within a lavatory basin, contaminants, such as water stain (mineral content and dirt piled up thereon) and darkening, were removed by alkaline detergent, acid cleaning agent, etc., followed by wiping off the water content with a dry cloth. Then the composition of embodiment with the solid content of 13% was applied all over the interior surface of laboratory basin with a cloth. After drying, the same composition of embodiment was further applied 3 times in the same way as above. After well drying, the coating film was gradually heated by far-infrared heater, and baked for 20 to 30 min at a temperature of about 400° C.

After the lapse of 6 months, during which no cleaning agents including acid cleaning agent for lavatory basins were used at all after the application of the composition of embodiment, the observation of the lavatory basin showed that there was no odor. Now, after the lapse of 8 months, the effect still remains.

Example 6 of Experiment

By applying the composition of embodiment to interior bright tiles to be used for existing kitchen walls, an experiment was carried out for confirming that grease buildup thereon could easily be removed.

After cleaning the contamination of existing tiles by mild detergent and wiping well off the detergent with a wet cloth, in the same was as the example 2 of experiment, the waterborne inorganic coat agent multi-type of the composition of embodiment was used and applied with a cloth as a primer and a top coat agent, and the present invention was recoated 2 times as an intermediate coat agent with a cloth.

Now, after the lapse of 8 months under the normal use, the effect still remains. After the application, contaminants on the coated surface were wiped off 2 times a day with a wet towel, well twisted.

Example 7 of Experiment

Regarding the removal of fingerprints, the comparison test between the present invention and a coat agent for stainless steel which is normally used was carried out. Results are shown in Table 7.
Purpose;
Various tests were performed for mainly interior and exterior building materials and equipment materials made of SUS.
Base material; SUS-304, 1.5 mm (thickness) with vibration finish
Chemical Agent Used;
The present invention with the molar ratio of 4.3 and the solid content of 6.65% was used.
Coating method; By a high fog air spray gun (reciprocating coating 2 times)
Baking; 200° C.×20 min
Thickness of film formed; 1~2 μm with clear finish
Obtained cooperation from some stainless steel processing manufacturer in experiment data.
Each film thickness other than that of the composition of embodiment was based on the thickness determined depending respective characteristic. (Refer to other experiment)

TABLE 7

Removability of fingerprints

| | Immediately after application | | 24 Hrs later | | After immersion test in boiling water for 2 Hrs | |
|---|---|---|---|---|---|---|
| | Wiping with dry cloth | Wiping with wet cloth | Wiping with dry cloth | Wiping with wet cloth | Wiping with dry cloth | Wiping with wet cloth |
| Composition of embodiment | ○ | ○ | ○ | ○ | X | ○ |
| No treatment | X | ○ | X | ○ | — | — |
| Polyethylene fluoride base wax | Δ | ○ | ○ | ○ | — | — |
| Titanium oxide hydrophilic film | ○ | ○ | ○ | ○ | X | Δ |
| Acrylic clear coating film | Δ | ○ | Δ | ○ | ○ | ○ |
| Silicon clear coating film | ○ | ○ | ○ | ○ | Δ | ○ |
| Fluorinated clear coating film | ○ | ○ | Δ | ○ | ○ | ○ |

○; Completely removed and indistinctive
Δ; Slightly visible with a small amount of residue
X; Impossible to remove and highly visible Example 8 of Experiment The degree of removal of magic marker stains was compared between an object applied with the composition of embodiment and other objects applied with conventional coating agents. Results are shown in Table 8.

TABLE 8

Resistance to magic marker stains

| | Immediately after application | | | 24 Hrs later | | | After immersion test in boiling water for 2 Hrs | | |
|---|---|---|---|---|---|---|---|---|---|
| | (a) | (b) | (c) | (a) | (b) | (c) | (a) | (b) | (c) |
| Composition of embodiment | X | ○ | ○ | Δ | ○ | ○ | X | ○ | ○ |
| No treatment | X | X | ○ | X | X | ○ | — | — | — |
| Polyethylene fluoride base wax | X | X | ○ | Δ | Δ | ○ | — | — | — |
| Titanium oxide hydrophilic film | X | X | ○ | X | X | ○ | X | X | ○ |
| Acrylic clear coating film | X | X | Δ | X | X | Δ | X | X | Δ |

TABLE 8-continued

Resistance to magic marker stains

| | Immediately after application | | | 24 Hrs later | | | After immersion test in boiling water for 2 Hrs | | |
|---|---|---|---|---|---|---|---|---|---|
| | (a) | (b) | (c) | (a) | (b) | (c) | (a) | (b) | (c) |
| Silicon clear coating film | X | X | ○ | X | X | ○ | X | X | ○ |
| Fluorinated clear coating film | X | X | ○ | X | X | ○ | X | X | ○ |

(a) Wipe with a dry cloth
(b) Wipe with a wet cloth
(c) Wipe with alcohol
○; Completely removed and indistinctive
Δ; Slightly visible with a small amount of residue
X; Impossible to remove and highly visible Results of other performance tests are shown in Table 9.

TABLE 9

Comparison of other performance tests

| | Film thickness (actual measurement) | Pencil hardness | Square tape peel-off test | Abrasion resistance test |
|---|---|---|---|---|
| Composition of embodiment | 2 μm | 9H | No peeling | ○ |
| Polyethylene fluoride base wax | Unmeasurable | — | — | Δ |
| Titanium oxide hydrophilic film | Unmeasurable | 3H | No peeling | X |
| Acrylic clear coating film | 18 μm | H | No peeling | X |
| Silicon clear coating film | 20 μm | 3H | No peeling | X |
| Fluorinated clear coating film | 15 μm | H | No peeling | Δ |

○; Little scratches
Δ; Slight scratches
X; Many scratches

Abrasion Test;
  Abrasive paper #4000, with a load of 150 g
  Appearance evaluation after reciprocating movement (10, 20, 50 and 100 times)

Results of detergent and chemical resistance are shown in Table 10.

TABLE 10

Detergent and chemical resistance

| | Detergent resistance (immersion for 24 Hrs at normal temp.) | | Chemical resistance (immersion for 24 Hrs at normal temp.) | |
|---|---|---|---|---|
| | 10% of "Heiter" | 10% of "Mama Lemon" | 10% of NaOH | 10% of sulfuric acid |
| Composition of embodiment | ○ | ○ | ○ | ○ |
| Titanium oxide hydrophilic film | ○ | ○ | X | X |
| Acrylic clear coating film | ○ | ○ | ○ | X |
| Silicon clear coating film | ○ | ○ | ○ | X |
| Fluorinated clear coating film | ○ | ○ | ○ | Δ |

○; No change of appearance
Δ; Slight change of color
X; Change of color

Results of performance test on post-processability are shown in Table 11.

TABLE 11

Post-processability

| | Shear-cutting property | Laser-cutting property | V bendability | Normal bendability | Energization property |
|---|---|---|---|---|---|
| Composition of embodiment | ○ | ○*1 | ○*2 | ○*2 | X*3 |
| Titanium oxide hydrophilic film | ○ | ○ | ○ | ○ | ○ |
| Acrylic clear coating film | X*4 | X*5 | X*4 | X*4 | X |
| Silicon clear coating film | X*4 | X*5 | X*4 | X*4 | X |
| Fluorinated clear coating film | X*4 | X*5 | X*4 | X*4 | X |

*1 In the case of a straight line cutting, acceptable. In the case of a curved line the heat input was increased so that the powdering area was enlarged.
*2 No peeling but the occurrence of cracks was observed.
*3 No electrical conductivity but electric welding was possible for edge faces, rear faces, etc.
*4 Films fell away.
*5 Films were burnt and their colors changed.

The water-borne complete inorganic alkali metal silicate composition, which is a coat agent in accordance with the present invention and adjusted to have the solid content of 1 w %, was used as a primer with a cloth to the surface of a stainless steel storage tank (3 m in height and 2 m in diameter). Subsequently, the same composition adjusted to have the solid content of 13 w % was recoated over the tank by a spray gun several times. The film thickness became about 2~3 μm. It is common that at brewery companies fermenters dispersed into the air cause the surrounding area to be covered with black mold in about 2 weeks. Even after the lapse of 4 months after application, however, it was confirmed that the surrounding area was totally free of mold. Contaminants had been removed due to rainfall, snowfall, etc., and the problems including efflorescence, which were supposed to occur at ambient drying, were not observed.

In addition, the water-borne complete inorganic alkali metal silicate composition adjusted to have the solid content of 30 w % was mixed with 1.5 w % of a fast-acting curative agent, comprising of a simple of any of zinc oxide, zinc borate or sodium tetraborate, or a mixture including a plurality of them. Then it was spray-painted by a spray gun to a bare concrete. An example of mixture is shown in Table 12. As a result of comparing the coated site with the site without coating 4 months later, it was confirmed that there was the change of color to yellow on the site without coating but no change of color at all on the coated site.

TABLE 12

| Name of compound | Chemical symbol | Blending quantity (g) | Blending proportion w/% |
|---|---|---|---|
| Zinc oxide | ZnO | 24 | 41.38% |
| Zinc borate | $2ZnO \cdot 3B_2O_3 \cdot 5H_2O$ | 24 | 41.38% |
| Sodium tetraborate | $Na_2B_4O_7$—$10H_2O$ | 10 | 17.24% |
| Total | | 58 | 100% |

Regarding zinc borate and sodium tetraborate, they were used in hydrated form such as 5 and 10 hydrates respectively. However, they may be used in anhydrous state.

Incidentally, it was confirmed that actual experiments confirmed that the coat agent in accordance with the present invention and the water-borne complete inorganic alkali metal silicate composition adjusted to have the solid content being within a range of 0.1 to 35 w % had sufficient effects. In this patent specification, however, the description is made by way of example that the solid content in the composition is 1 w %.

The tests were conducted by using the water-borne complete inorganic alkali metal silicate composition with its molar ratio and the heavy Baume degree of the silica solid content to the alkali metal solid content being within a range of 2.7 to 4.8 and 16 to 35 respectively. As a result, the composition with these values being within the ranges mentioned above was found to be usable. As an example, a super heat-resistant complete inorganic colored coating material as shown in table 13 was prepared as follows: The water-borne complete inorganic alkali metal silicate composition was diluted with water and adjusted to have the molar ratio of 4.8 and the concentration of solid content of 25 w % (heavy Baume degree of 24). The same composition as a binder and the pigment were blended at the ratio of 71.42 w % and 28.58 w %.

TABLE 13

| Name of compound | Chemical symbol | Blending proportion w/% | Remarks |
|---|---|---|---|
| Anhydrous silicate | $SiO_2$ | 31% | Heat resistant material |
| Alumina | $Al_2O_3$ | 22% | Heat resistant material |
| Oxdized zirconium | $ZrO_2$ | 6% | Heat resistant material/Expansion coefficient conditioner |
| Zinc oxide | ZnO | 2% | Curing accelerator |
| Mica | | 10% | Volume contraction reliever |
| Sodium tetrabirate | $Na_2B_4O_7 \cdot 10H_2O$ | 2% | Adhesion accelerator |
| Colored inorganic pigment | | 27% | Inorganic pigment colorant |
| Total of pigment | | 100% | |

| Ratio by weight of mixture | | Blending quantity (g) | Blending proportion w % |
|---|---|---|---|
| Water-borne complete inorganic alkali metal silicate composition | Mol = 4.8 Heavy Baume = 24 (Solid content 25 w %) | 250 g | 71.42% |
| Pigment | | 100 g | 28.58% |
| Total | | 350 g | 100% |

Compounds listed in Table 13 were mixed in accordance with the blending proportion also mentioned in the same table, and put into a 500 ml polyethylene container. Then, 250 g of Titanium Bead (2.2 mm in diameter) to the blending quantity listed in the table above was put into the container and dispersed by a paint shaker (640 r.p.m.) for 30 to 40 min.

This was applied on the surface of stainless steel SUS-304 by a spray gun to obtain the film thickness of about 30 to 40 μm. The film was heated at 120° C. The heating temperature was gradually increased to 230° C., where the film was temporarily baked for 20 min. Subsequently the temperature was further increased to 600 to 700° C., where the film was baked for 30 min to 1 hour.

Tests of boiling water resistance, alkali resistance, moisture resistance and heat resistance were made on the film just after temporary baking (at the temperature of 120 to 230° C. for 20 min), and good results were obtained on all items.

Additionally, the heat resistance test at the temperature of 600° C. for 30 hours was conducted, followed by tests on boiling water resistance (10 hours), salt water resistance (5% NaCl at room temperature for 2 weeks) and alkali resistance (5% NaOH at room temperature for 1 month). All test results showed no change of the film.

What is claimed is:

1. A water-borne inorganic alkali metal silicate composition prepared by mixing an alkali metal silicate comprising a mixture of potassium silicate and sodium silicate, a colloidal silica, and a phosphate compound selected from a sodium phosphate compound, a potassium phosphate compound or a mixture thereof,
wherein a molar ratio of a total silica solid content ($SiO_2$) to a total alkali metal solid content is within a range of 4.3 to 6.0; the total silica solid content ($SiO_2$) is a total of silica solid contents ($SiO_2$) in the alkali metal silicate and in the colloidal silica; and the total alkali metal solid content is a total of alkali metal solid contents in the alkali metal silicate and in the phosphate compound.

2. The water-borne inorganic alkali metal silicate composition according to claim 1, wherein the ratio by weight of the solid content in the phosphate compound to the total solid content in the water-borne inorganic alkali metal silicate composition is within a range of 0.1 to 5%.

3. An aqueous solution of the water-borne inorganic alkali metal silicate composition according to claim 1, wherein the concentration of solid content therein is within a range of 0.1 to 35%.

4. An inorganic colored coating material comprising 0.1 to 35% of the solid content in the water-borne inorganic alkali metal silicate composition according to claim 1, which is further added by any or a plurality of a clear coat agent, a binder for photocatalyst or an inorganic pigment.

5. A binder for a high temperature and heat resistant coating material, wherein the molar ratio and the heavy Baume degree of the silica solid content to the alkali metal solid content in the water-borne inorganic alkali metal silicate composition according to claim 1 is within a range of 2.7 to 4.8 and 16 to 35 respectively.

6. A method of using the water-borne inorganic alkali metal silicate compound of claim 1, wherein at the time of using the water-borne inorganic alkali metal silicate composition, any one or a plurality of zinc oxide, zinc borate or sodium tetraborate is mixed therein as a fast acting curative agent.

7. A water-borne coat agent and an aqueous solution thereof, primarily comprising the water-borne inorganic alkali metal silicate composition of claim 1.

8. The water-borne inorganic alkali metal silicate composition according to claim 1, wherein, in the mixture of potassium silicate and sodium silicate, a molar amount of potassium oxide in the potassium silicate is greater than a molar amount of sodium oxide in the sodium silicate.

9. The water-borne inorganic alkali metal silicate composition according to claim 1, wherein a molar ratio of potassium oxide in the potassium silicate to sodium oxide in the sodium silicate, expressed as potassium oxide: sodium oxide, is in the range from 0.36:0.036 to 0.38:0.034.

10. An aqueous solution of the water-borne inorganic alkali metal silicate composition according to claim 2, wherein the concentration of solid content therein is within a range of 0.1 to 35%.

11. An inorganic colored coating material comprising 0.1 to 35% of the solid content in the water-borne inorganic alkali metal silicate composition according to claim 2, which is further added by any or a plurality of a clear coat agent, a binder for photocatalyst or an inorganic pigment.

12. A binder for a high temperature and heat resistant coating material, wherein the molar ratio and the heavy Baume degree of the silica solid content to the alkali metal solid content in the water-borne inorganic alkali metal silicate composition according to claim 2 is within a range of 2.7 to 4.8 and 16 to 35 respectively.

13. The water-borne inorganic alkali metal silicate composition according to claim 2, wherein, in the mixture of potassium silicate and sodium silicate, a molar amount of potassium oxide in the potassium silicate is greater than a molar amount of sodium oxide in the sodium silicate.

14. The water-borne inorganic alkali metal silicate composition according to claim 2, wherein a molar ratio of potassium oxide in the potassium silicate to sodium oxide in the sodium silicate, expressed as potassium oxide: sodium oxide, is in the range from 0.36:0.036 to 0.38:0.034.

* * * * *